US011601297B2

(12) United States Patent
Hsieh (10) Patent No.: US 11,601,297 B2
(45) Date of Patent: Mar. 7, 2023

(54) WIRELESS AUDIO OUTPUT DEVICE AND OPERATION METHOD THEREOF

(71) Applicant: Airoha Technology Corp., Hsinchu (TW)

(72) Inventor: Ming-Yi Hsieh, Hsinchu (TW)

(73) Assignee: AIROHA TECHNOLOGY CORP., Hsinchu (TW)

(*) Notice: Subject to any disclaimer, the term of this patent is extended or adjusted under 35 U.S.C. 154(b) by 48 days.

(21) Appl. No.: 17/094,913

(22) Filed: Nov. 11, 2020

(65) Prior Publication Data

US 2021/0144020 A1 May 13, 2021

Related U.S. Application Data

(60) Provisional application No. 62/934,528, filed on Nov. 13, 2019.

(30) Foreign Application Priority Data

Jun. 4, 2020 (TW) ................... 109118826

(51) Int. Cl.
*H04L 12/18* (2006.01)
*H04W 76/40* (2018.01)
*H04W 36/24* (2009.01)
*H04L 1/08* (2006.01)

(52) U.S. Cl.
CPC .......... *H04L 12/189* (2013.01); *H04W 76/40* (2018.02); *H04L 1/08* (2013.01); *H04W 36/24* (2013.01)

(58) Field of Classification Search
CPC ........ H04L 12/189; H04L 1/08; H04W 36/24; H04W 76/40
See application file for complete search history.

(56) References Cited

U.S. PATENT DOCUMENTS

2019/0098673 A1* 3/2019 Goyal ................ H04L 12/1877
2019/0102143 A1* 4/2019 Kumar ................ H04L 1/0007

FOREIGN PATENT DOCUMENTS

KR 1020190098038 A 8/2019

OTHER PUBLICATIONS

TW Office Action dated Nov. 30, 2020 in Taiwan application (No. 109118826).

* cited by examiner

*Primary Examiner* — Kevin C. Harper
(74) *Attorney, Agent, or Firm* — McClure, Qualey & Rodack, LLP (57) ABSTRACT

A wireless audio output device includes a plurality of audio output units, first and second audio output units among the audio output units being set as first and second roles, respectively. The first role is to establish a multicast link with a source device, to receive one or more media packets from the source device on the multicast link, and to perform bidirectional communication with the source device. The second role is to join the multicast link, to receive the one or more media packets from the source device on the multicast link, to perform unidirectional communication with the source device, and to perform unidirectional and/or bidirectional communication with the first role. An extended packet time slot is divided and each of the first role and the second role transmits or receives one or more extended packets during the extended packet time slot.

16 Claims, 10 Drawing Sheets

WIRELESS AUDIO OUTPUT DEVICE AND OPERATION METHOD THEREOF

This application claims the benefit of U.S. provisional application Ser. No. 62/934,528, filed Nov. 13, 2019, the subject matter of which is incorporated herein by reference. This application claims the benefit of Taiwan application Serial No. 109118826, filed Jun. 4, 2020, the subject matter of which is incorporated herein by reference.

BACKGROUND OF THE INVENTION

Field of the Invention

The invention relates in general to a wireless audio output device and an operation method thereof.

Description of the Related Art

Portable electronic devices such as mobile phones and tablets have gained a great popularity in people's lives. Among peripheral devices of the portable electronic devices, audio output devices play an important role. An audio output device normally includes a headset and a speaker. To provide better convenience, wirelessness of the audio output device is a tendency.

SUMMARY OF THE INVENTION

The invention is directed to a wireless audio output device.

According to one embodiment of the present invention, a wireless audio output device is provided. The wireless audio output device includes a plurality of audio output units, a first audio output unit and a second audio output unit among the audio output units being set as a first role and a second role, respectively. The first role is configured to establish a multicast link with a source device, to receive one or more media packets from the source device on the multicast link, and to perform bidirectional communication with the source device. The second role is configured to join the multicast link, to receive the one or more media packets from the source device on the multicast link, to perform unidirectional communication with the source device, and to perform unidirectional and/or bidirectional communication with the first role. An extended packet time slot is divided and each of the first role and the second role transmits or receives one or more extended packets during the extended packet time slot.

According to another embodiment of the present invention, an operation method of a wireless audio output device is provided. The wireless audio output device includes a plurality of audio output units, a first audio output unit and a second audio output unit among the audio output units being set as a first role and a second role, respectively. The operation method includes: establishing a multicast link with a source device by the first role to receive one or more media packets from the source device on the multicast link, and to perform bidirectional communication with the source device; joining the multicast link by the second role to receive the one or more media packets from the source device on the multicast link, perform unidirectional communication with the source device, and to perform unidirectional and/or bidirectional communication with the first role. An extended packet time slot is divided and each of the first role and the second role transmits or receives one or more extended packets during the extended packet time slot.

The above and other aspects of the invention will become better understood with regard to the following detailed descriptions of the preferred but non-limiting embodiment(s). The following description is made with reference to the accompanying drawings.

DETAILED DESCRIPTION OF THE INVENTION

Figure 1:
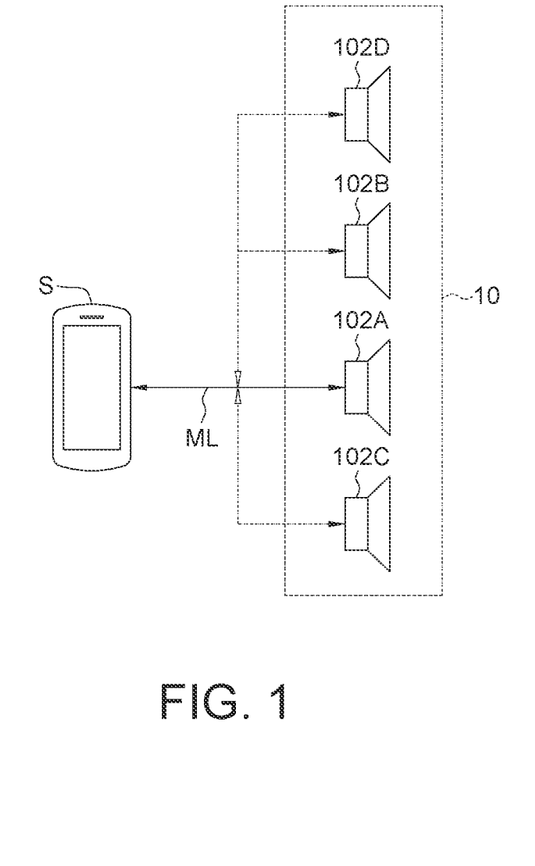
FIG. 1 is a schematic diagram of a wireless audio output device according to an embodiment of the present invention.

Referring to FIG. 1, a schematic diagram of a wireless audio output device 10 according to an embodiment of the present invention is shown. The wireless audio output device 10 includes a first audio output unit 102A, and one or more second audio output units 102B to 102D. The wireless audio output device 10 can be realized by a speaker, wherein the first audio output unit 102A is a main channel output, and each of the second audio output units 102B to 102D is a sub-channel output or a subwoofer output. In another possible embodiment, the audio output units 102A to 102D are wireless Bluetooth earbuds.

One of the audio output units 102A to 102D is set as a first role R1, and the remaining three audio output units are respectively set as a second role R2, a third role R3 and a fourth role R4. For the convenience of description, the audio output unit 102A is set as the first role R1, and the audio output units 102B to 102D are respectively set as the second role R2, the third role R3 and the fourth role R4. The present invention is not limited thereto.

The present embodiment discloses several roles including an agent, a client, a partner, and a follower. The agent (represented by designation A) is specified in the Bluetooth protocol and the agent is linked to a source device S, wherein the source device S is realized by a smart mobile device (such as a smart phone). The client (represented by designation C) is specified in the Bluetooth protocol, and is used as the reception node in the "multicast link". The partner (represented by designation P) is specified in the Bluetooth protocol (particularly, extended from the client), and can exchange data with the agent. The follower (represented by designation F) is specified in the Bluetooth protocol (particularly, extended from the client), and can support media data recovery with the agent.

For the convenience of description, the first role R1 is the agent, but the present invention is not limited thereto. The first role R1 (the agent) is configured to establish a multicast link ML with the source device S. The source device S is a smart mobile device (such as a smart phone) as specified in the Bluetooth protocol. The "multicast link" in the application refers to a link, which allows a transmission node to transmit message/packet to several specific reception nodes in a single transmission operation. That is, the transmission node can transmit data to several specific reception nodes on the multicast link in a single transmission operation. In the present embodiment, the multicast link ML is based on Bluetooth transmission. The agent can receive one or more media packets from the source device S on the multicast link ML. The media packet may include a synchronous connection-oriented (SCO) packet, an extended synchronous connection-oriented (eSCO) packet, an advanced audio distribution profile (A2DP) packet and similar multicast packets. Voice data can be transmitted using SCO packets and extended SCO packets, and audio data can be transmitted using A2DP packets. Or, SCO packets and extended SCO packets also can be referred as voice packets. The first role R1 (the agent) also can perform bidirectional communication with the source device S on the multicast link ML. For example, a communication protocol between the first role R1 (the agent) and the source device S can be a handshake protocol. That is, the first role R1 (the agent) and the source device S can transmit control signals and respond to the received control signal to each other on the multicast link ML.

The second role R2 can be realized by the client, but the present invention is not limited thereto. The second role R2 (the client) can receive media packets from the source device S on the multicast link ML. The second role R2 (the client) can perform unidirectional communication with the source device S and perform unidirectional and/or bidirectional communication with the first role R1 (the agent) on the multicast link ML. In other words, the second role R2 (the client) can receive control signals and media packets from the source device S on the multicast link ML even without making response. The second role R2 (the client) and the first role R1 (the agent) can transmit control signals and packets to each other on the multicast link ML; and the second role R2 (the client) and the first role R1 (the agent) can respond to the received control signals and packets to each other on the multicast link ML. It should be noted that in communication between the second role R2 (the client) and the first role R1 (the agent), the reception node is not necessary to have response.

For the convenience of description, the designation "R1 (A)" shown in the accompanying drawings represents that the first role R1 is set as the agent and the rest can be obtained by the same analogy. For example, the designation "R2 (C)" shown in the accompanying drawings represents that the second role R2 is set as the client. Similarly, the designations F1 and F2 represent a first follower and a second follower, respectively, wherein the designations C1 and C2 represent a first client and a second client, respectively.

Figure 2:
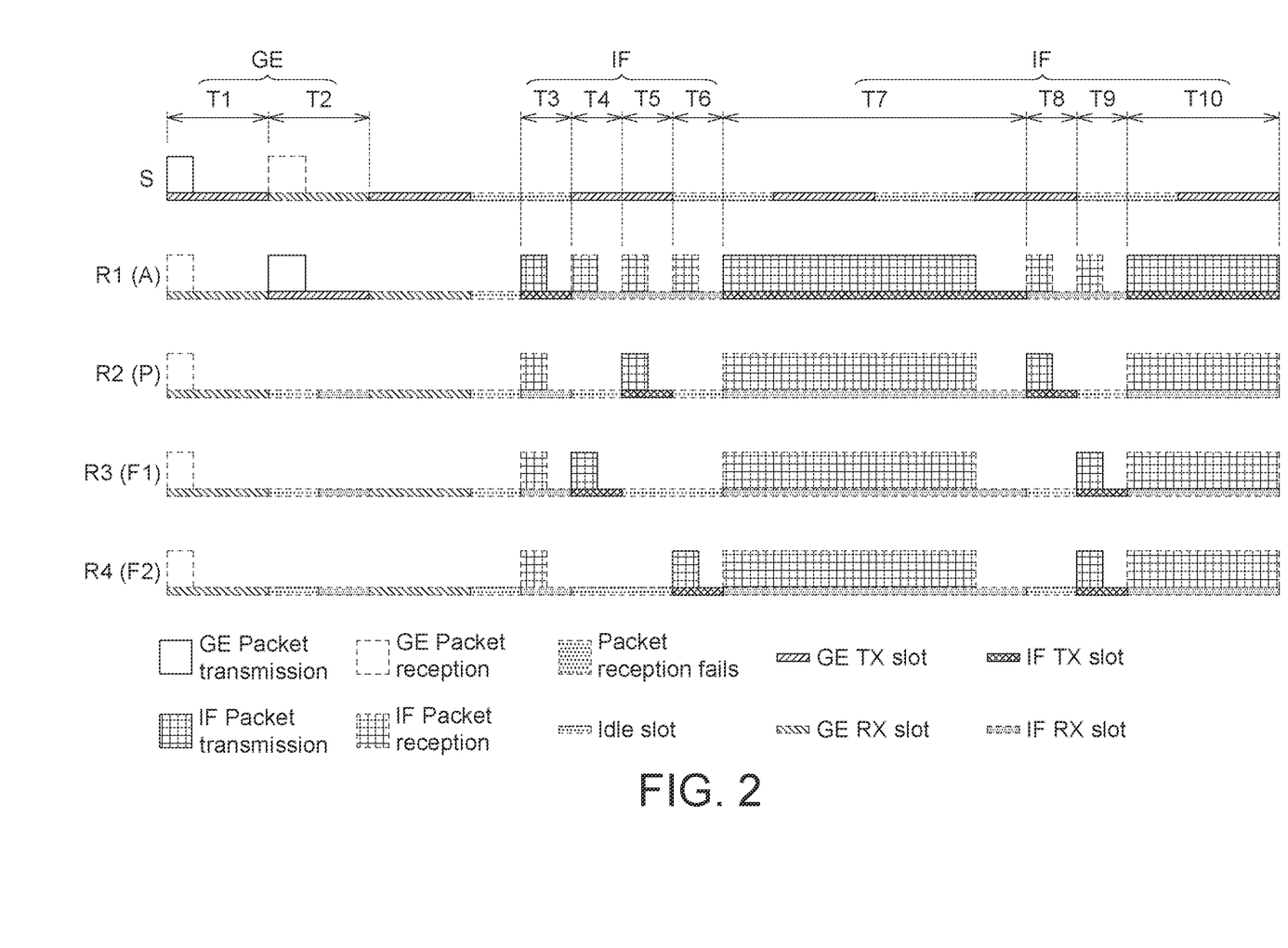
FIG. 2 is a timing diagram of packet transmission and packet reception according to an embodiment of the present invention.

Referring to FIG. 2, a timing diagram of packet transmission and packet reception according to an embodiment of the present invention is shown. In the present embodiment, the source device S is realized by a standard Bluetooth device. That is, a time slot for the source device S is designed based on a standard Bluetooth protocol. The time slot for the first role R1, the second role R2 (P), the third role R3 (F1, a follower) and the fourth role R4 (F2, a follower) is also designed based on the standard Bluetooth protocol and is further augmented. It is assumed that the wireless audio output device 10 and the source device S are paired with each other; and the multicast link ML is established between the wireless audio output device 10 and the source device S. That is, the wireless audio output device 10 and the source device S can be regarded as a packet transmission system.

The source device S transmits packets to the first role R1, the second role R2 (P), the third role R3 (F1) and the fourth role R4 (F2). In response to the packet from the source device S, the first role R1 transmits an acknowledge signal (ACK) or a non-acknowledge signal (NAK) to the source device S.

In the present embodiment, in time domain, the packet transmission system has two types of packet transmission time, namely a standard packet time (denoted as GE) and an extended packet time (denoted as IF). During the standard packet time GE, the source device S can transmit control signals and media packets to the first role R1, the second role R2, the third role R3 and the fourth role R4. The first role R1 can receive control signals and media packets from the source device S and send a response to the source device S in response to the received control signal and the media packet. The second role R2, the third role R3 and the fourth role R4 can receive control signals and media packets from the source device S. During the extended packet time IF, the first role R1, the second role R2, the third role R3 and the fourth role R4 can exchange one or more extended packets with each other. Details of extended packets are disclosed below.

For example, during a time period T1, the source device S transmits control signals or media packets (during transmission (TX) slot), and the first role R1, the second role R2, the third role R3 and the fourth role R4 receive the transmitted control signals or the media packets (during receiving (RX) slot). During a time period T2, based on the received control signals or the media packets, the first role R1 sends a response to the source device S (during TX slot), and the source device S receives the response from the first role R1 (during RX slot). It should be noted that the second role R2, the third role R3 and the fourth role R4 do not receive the response, wherein such response is transmitted from the first role R1 to the source device S based on the control signals (during RX slot).

During a time period T3, the first role R1 transmits extended packets (during TX slot), and the second role R2, the third role R3 and the fourth role R4 receive the extended packets (during RX slot). During following time slots, the second role R2, the third role R3 and the fourth role R4 can transmit the extended packets to the first role R1. For example, during a time period T4, the third role R3 transmits extended packets (during TX slot), the first role R1 receives the transmitted extended packets (during RX slot). During a time period T5, the second role R2 transmits extended packets (during TX slot), and the first role R1 receives the transmitted extended packets (during RX slot). During a time period T6, the fourth role R4 transmits extended packets (during TX slot), and the first role R1 receives the transmitted extended packets (during RX slot).

In the present embodiment, an extended packet time (IF) slot is divided and different roles (such as the first role R1, the second role R2, the third role R3 and the fourth role R4) can transmit or receive extended packets during the extended packet time slot. As a result, the efficiency can be improved.

In the present embodiment, in transmission of extended packets (during the time periods T3 to T6), each of the first role R1, the second role R2, the third role R3 and the fourth role R4 can transmit its own buffer report. Or, when transmitting extended packets (during the time periods T3 to T6), each of the first role R2, the third role R3 and the fourth role R4 can inform the first role R1 about its own packet loss state.

After receiving states of the second role R2, the third role R3 and the fourth role R4, if the first role R1 recognizes that at least one of the second role R2, the third role R3 and the fourth role R4 has lost the packets, the first role R1 can start to re-transmit the packets.

During a time period T7, the first role R1 re-transmits the extended packets (also referred to as an error correction packet) to the second role R2, the third role R3 and the fourth role R4. During a time period T8, the second role R2 (the partner) responds an acknowledge signal or a non-acknowledge signal to the first role R1. During a time period T9, the third role R3 and the fourth role R4 (both are the followers) can share the same time slot and respond a non-acknowledge signal to the first role R1. If the first role R1 receives the non-acknowledge signal again, then the first role R1 re-transmits packets to the second role R2, the third role R3 and the fourth role R4 during a time period T10. In the present embodiment, the packets transmitted by the first role R1 during the time period T7 are not identical to the packets transmitted during the time period T10. However, function of the packets transmitted during the time period T7 is the same as the function of the packets transmitted during the time period T10. In further detail, the packets transmitted during the time period T7 is for the second to fourth roles R2 to R4 to perform packet recovery. Similarly, the packets transmitted during the time period T10 is for the second to fourth roles R2 to R4 to perform packet recovery.

It should be noted that when the first role R1, the second role R2, the third role R3 and the fourth role R4 exchange the extended packets, the start time for transmitting the extended packets does not have to be aligned with the start time of the RX slot of the source device S. Therefore, operations of the source device S conform to the standard Bluetooth protocol, and the source device S does not receive the extended packets from the first role R1, the second role R2, the third role R3 and the fourth role R4. In other words, the source device S is a standard Bluetooth device.

Figure 3A:
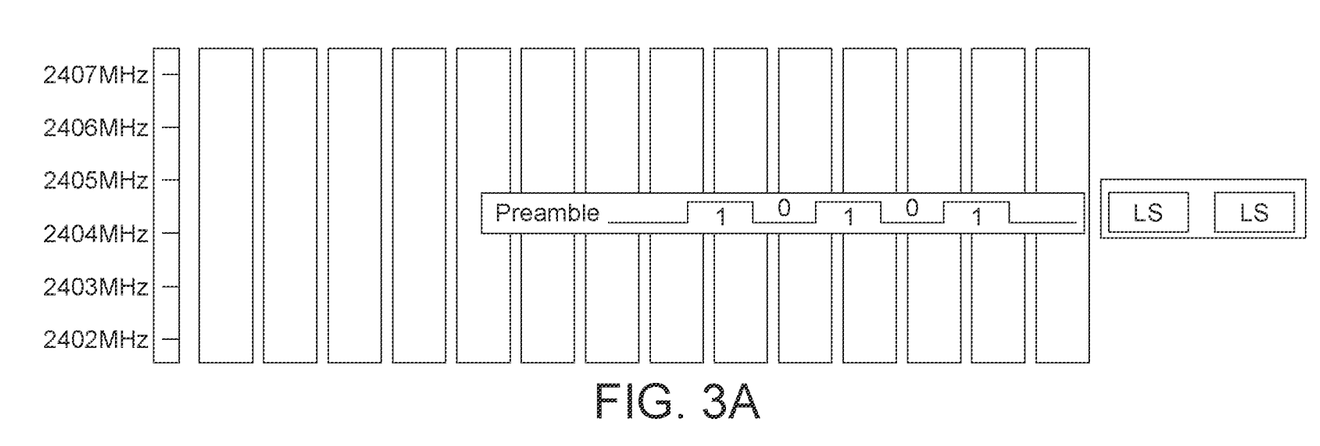
FIG. 3A is a schematic diagram of transmitting link setup packets by a first role according to an embodiment of the present invention.
Figure 3B:
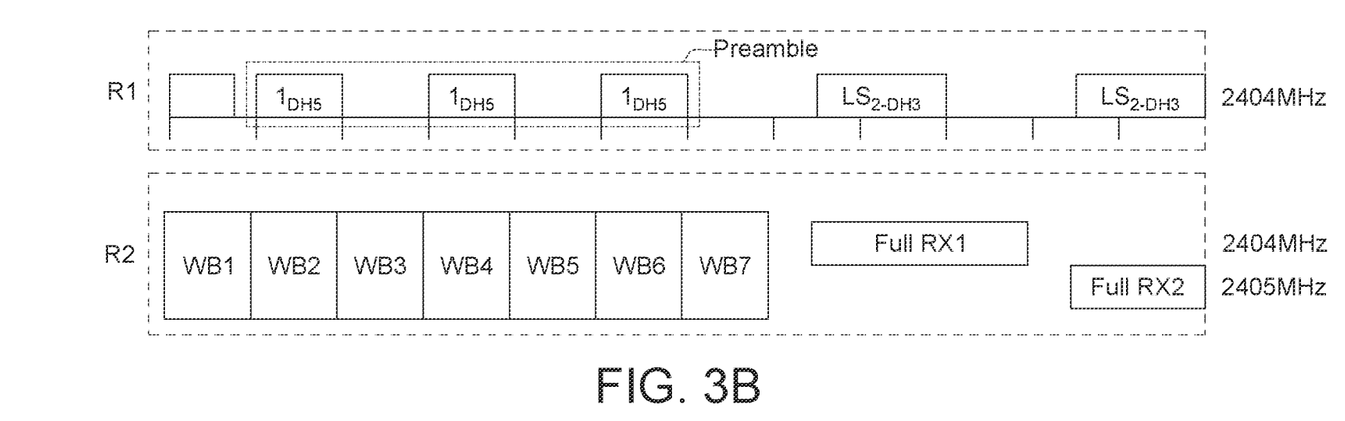
FIG. 3B is a schematic diagram of receiving link setup packets by a second role according to an embodiment of the present invention.

Detailed descriptions of the extended packets are disclosed below. FIG. 3A is a schematic diagram illustrating transmitting link setup packets from the first role according to an embodiment of the present invention. FIG. 3B is a schematic diagram of receiving link setup packets by the second role according to an embodiment of the present invention. The extended packets may include link setup packets, link update packets and link re-setup packets. The descriptions below are exemplified by the second role R2. However, the descriptions below can also be exemplified by the third role R3 or the fourth role R4.

The link setup packet is transmitted by the first role R1 and the second role R2 may detect the link setup packet from the first role R1 to join the multicast link ML. Specifically, since the multicast link ML of the present embodiment is based on the Bluetooth protocol, the multicast link ML can use a plurality of channels (the frequency band of each channel is one Mega Hertz (MHz)) in a particular frequency band (for example, 2402 MHz to 2480 MHz) of the Bluetooth protocol. The link setup preamble code (denoted as Preamble) and the link setup packet (denoted as LS) is transmitted on the channel (2404 MHz as in the present embodiment with reference to FIG. 3A) currently used by the multicast link ML. The link setup preamble code Preamble can be realized by a string of binary sequence "10101".

The second role R2 repetitively performs wideband scanning over the particular frequency band used by the multicast link ML. For example, during a first wideband scanning period, the second role R2 scans several (such as two) channels in the particular frequency band until each channel in the particular frequency band is scanned once, and other wideband scanning can be performed by the same analogy. If the link setup preamble code and the link setup packet are already transmitted by the first role R1, then the second role R2 can detect the sequence in the 2404 MHz channel and the 2405 MHz channel during the wideband scanning period. Thus, the second role R2 can determine that the link setup packet LS is transmitted on one of the 2404 MHz channel and the 2405 MHz channel. Next, the second role R2 can initiate two full reception time slots full RX1 and full RX2. During the full reception time slot full RX1, the second role R2 receives the link setup packet LS on the 2404 MHz channel. During the full reception time slot full RX2, the second role R2 receives the link setup packet LS on the 2405 MHz channel. In the above example, it is assumed that during the full reception time slot full RX1, the second role R2 successfully receives the link setup packet LS on the 2404 MHz channel. Thus, the second role R2 can successfully join the multicast link ML using the received link setup packet LS.

It should be noted that, in order to reduce time required for the second role R2 to search the link setup preamble code Preamble and the link setup packet LS, wideband scanning is used in the search process of the above embodiment. However, in other embodiments, narrowband scanning is also used by the second role R2 to locate the channel where the link setup preamble code and the link setup packet are transmitted.

Under some circumstances, before the first role R1 establishes the multicast link ML with the source device S, the second role R2 repetitively performs wideband scanning to join the multicast link ML, and this increases power consumption of the wireless audio output device 10. To avoid the above power consumption problem, in an embodiment, before the multicast link ML is established (for example, when the first role R1 cannot detect the source device S), the first role R1 can establish a dummy link, which does not correspond to any source device. The first role R1 can transmit the link setup preamble code and the link setup packet on the dummy link. The second role R2 can join the dummy link like by joining the multicast link ML. Similarly, the first role R1 and the second role R2 also can perform unidirectional and/or bidirectional communication on the dummy link to exchange the extended packets.

Furthermore, the first role R1 can send a sleep notice to the second role R2 on the multicast link ML or the dummy link to cause the second role R2 to enter a sleep mode. In the sleep mode, the second role R2 can be in a low power consumption state. When a sleep timer expires, the second role R2 can leave the sleep mode to receive the link update packet from the first role R1 or receive media packets from the source device S.

The link update packet is transmitted to the second role R2 by the first role R1. The link update packet includes state information of the first role R1, such as the current state of a state machine of the first role R1. Since the second role R2 does not receive packets transmitted to the source device S from the first role R1, the second role R2 cannot recognize the current state of the first role R1. Thus, the second role R2 can update its own state machine according to the received link update packet to synchronize with the first role R1. For example, after the source device S and the first role R1 complete a task together (for example, finishing a call or finishing transmission of media packets), the first role R1 transmits a link update packet to the second role R2 to notify the second role R2 to release the resources of the second role R2.

The link re-setup packet is transmitted to the second role R2 by the first role R1. The link re-setup packet requests the second role R2 to interrupt (or leave) the link that the second role R2 currently joins, and to join another link instead. In an example, after the second role R2 joins a dummy link established by the first role R1, the first role R1 detects the source device S, establishes the multicast link ML with the source device S, and transmits the link re-setup packet to the second role R2. In response to the link re-setup packet, the second role R2 firstly interrupts the dummy link, and then joins the multicast link ML. In another example, after the second role R2 joins the multicast link ML established between the first role R1 and the source device S, the first role R1 detects a first source device (different from the source device S), establishes a first multicast link (different from the multicast link ML) with the first source device, and transmits the link re-setup packet to the second role R2. In response to the link re-setup packet, the second role R2 firstly interrupts the multicast link ML, and then joins the first multicast link.

In an embodiment, when the first role R1 (A) receives SCO packets, eSCO packets and/or control signals from the source device S, the first role R1 can request the source device S to re-transmit, the eSCO packets and/or the control signals for a specific number of times.

Figure 3C:
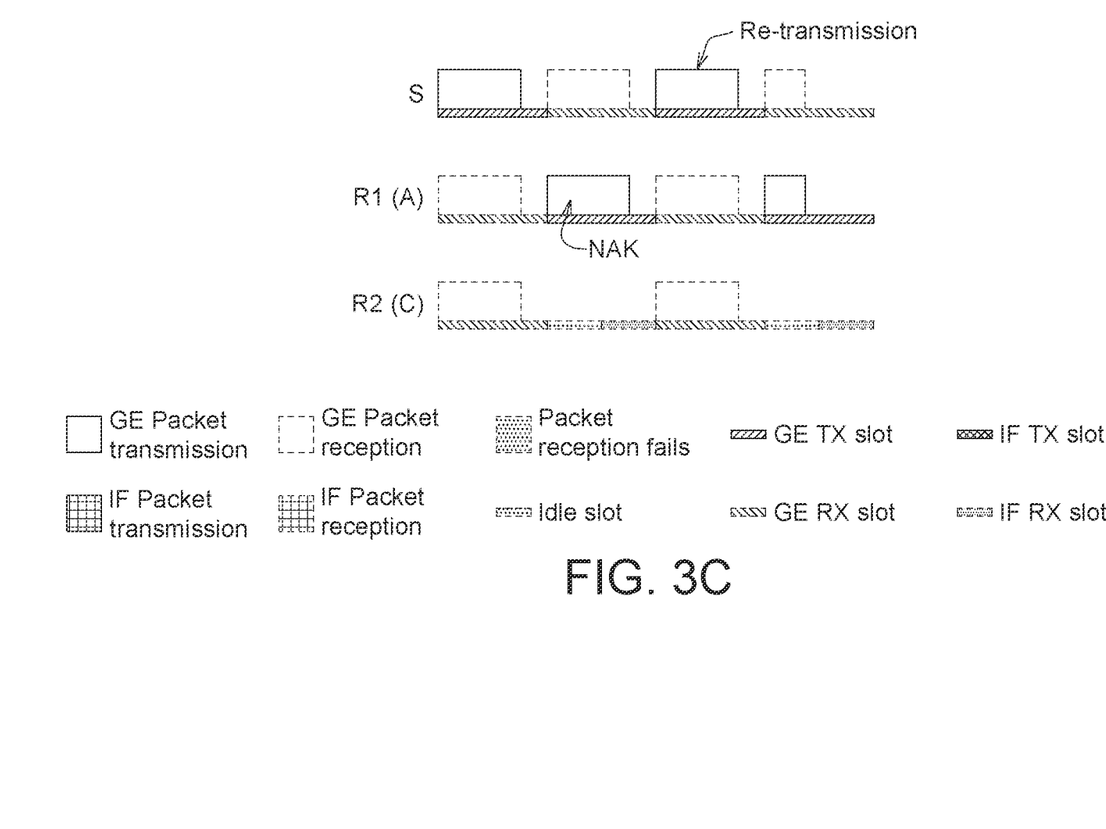
FIG. 3C is a schematic diagram of voice packet recovery according to an embodiment of the present invention.

Referring to FIG. 3C, a schematic diagram of voice packet recovery according to an embodiment of the present invention is shown. After the first role R1 receives an eSCO packet and/or a control signal from the source device S, the first role R1 responds an "NAK" signal to the source device S. In response to the "NAK" signal, the source device S transmits the eSCO packet and/or the control signal again, such that the first role R1 (A) and the second role R2 (C) both have additional opportunities to receive the eSCO packet and/or the control signal. That is, the first role R1 can transmit the "NAK" signal to the source device S to recover packets lost by the second role R2. Generally speaking, a quantity of "NAK" signals can be one or more, depending on a network state. That is, if the network state is poor, then the first role R1 (the agent) can transmit the "NAK" signal to the source device S for more times.

Figure 4:
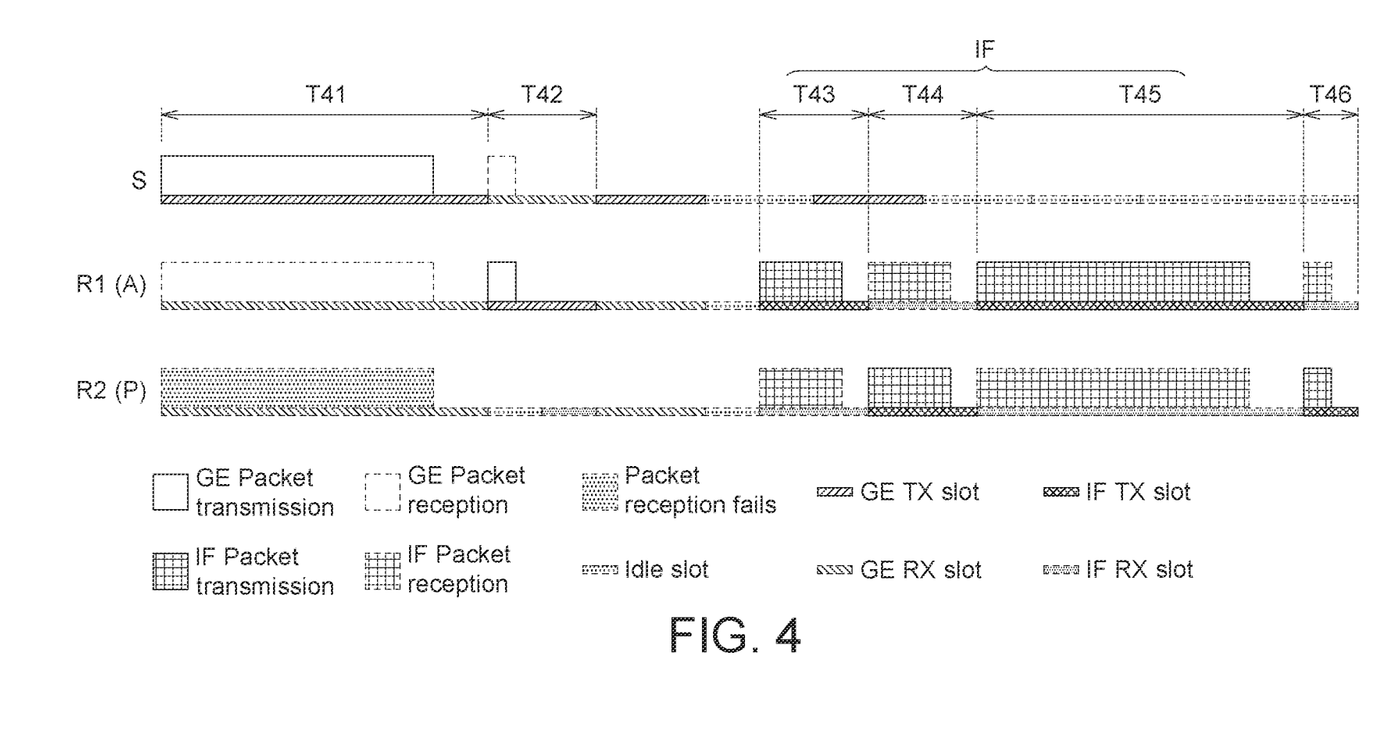
FIG. 4 is a schematic diagram of packet recovery according to an embodiment of the present invention, wherein, in response to the packet recovery request received from the partner, the agent transmits a recovery packet.

FIG. 4 is a schematic diagram of packet recovery according to an embodiment of the present invention, wherein in response to a packet loss recovery (PLR) request from the second role R2, the first role R1 can transmit a recovery packet. During a time period T41, the first role R1 receives A2DP packets from the source device S, and the first role R1 stores the A2DP packets from the source device S in a buffer (disposed in the first role R1), but the second role R2 does not receive any A2DP packets from the source device S due to other reasons. During a time period T42, the first role R1 transmits a response signal (an acknowledge signal) to the source device S.

After the A2DP packets received from the source device S are stored in the buffer, the first role R1 can transmit a buffer report (BR) to the second role R2 via extended packets during a time period T43. The buffer report records information (such as serial numbers, type, and size) of the A2DP packets stored in the buffer of the first role R1. The second role R2 determines whether the A2DP packets received by the second role R2 are complete by comparing the A2DP packets stored in a buffer of the second role R2 with the buffer report from the first role R1. If the second role R2 determines that some of the A2DP packets are lost or incomplete, the second role R2 sends a PLR request (during a time period T44), and reports a serial number of the lost or incomplete A2DP packets to the first role R1.

After the second role R2 sends the PLR request, the first role R1 can analyze the PLR request. During a time period T45, the first role R1 re-transmits a recovery report (RR) corresponding to the serial number based on the PLR request from the second role R2. During a time period T46, the second role R2 transmits an acknowledge signal or a non-acknowledge signal to the first role R1.

For example, in a transmission operation, the source device S transmits ten A2DP packets to the first role R1 and the second role R2. Based on a buffer report from the first role R1, if the second role R2 determines that No. 2 and No. 5 A2DP packets are lost, the second role R2 sends a PLR request to the first role R1 to request the first role R1 to re-transmit the No. 2 and No. 5 A2DP packets to the second role R2.

If two or more roles among the second role R2, the third role R3 and the fourth role R4 miss A2DP packets, then the roles which miss packets can send a PLR request (during time period T44) and report a quantity of lost or incomplete A2DP packets to the first role R1. As there are more than two roles sending the PLR request, it is possible that the PLR requests received by the first role R1 may collide with each other. Under such circumstance, in response to the received PLR requests, the first role R1 generates one or more error correction packets according to an error correction mechanism and the A2DP packets received by the source device S, and transmits the error correction packets to all roles (the second role R2, the third role R3 and the fourth role R4). The error correction mechanism may include, but not limited to, exclusive or (XOR) operation, GF-16 and Reed-Solomon (RS) code. For example, if the second role R2 misses the second A2DP packet and the third role R3 misses the fourth A2DP packet, then each of the second role R2 and the third role R3 responds to the first role R1 that one A2DP packet is lost. The first role R1 generates several error correction packets according to the first A2DP packet, the second A2DP packet, the third A2DP packet and the fourth A2DP packet using XOR operation, and transmits the generated error correction packets to the second role R2, the third role R3 and the fourth role R4. Based on the error correction packets, the second role R2 can recover the second A2DP packet and the third role R3 can recover the fourth A2DP packet.

Figure 5:
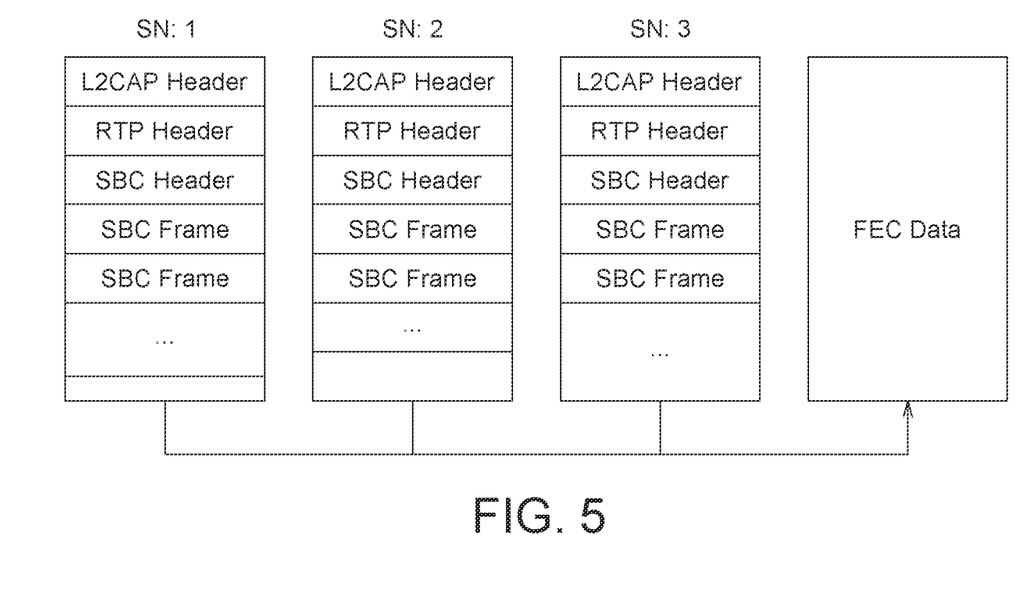
FIG. 5 is a schematic diagram of an example of error correction packet.

Referring to FIG. 5, a schematic diagram of an example of error correction packet is shown. Designation SN represents a packet serial number. Designation L2CAP header represents a logical link control and adaptation layer protocol header. Designation RTP Header represents a real-time protocol header. Designation SBC header represents a sub-band codec header. Designation SBC frame represents a sub-band codec frame. Designation FEC data represents a forward error correction data generated according to an error correction mechanism, No. 1 packet, No. 2 packet and No. 3 packet. The FEC data shown in FIG. 5 can be used as error correction packets and transmitted to the second role R2, the third role R3 and the fourth role R4 by the first role R1.

Refer to FIG. 2, during transmission periods of the extended packets, based on feedback of a state of each of the second role R2, the third role R3 and the fourth role R4, the first role R1 can recognize the packet loss state of the second role R2, the third role R3 and the fourth role R4. For example, feedbacks of the state show that the second role R2 (P) misses the n-th packet and the third role R3 misses the m-th packet. Therefore, the first role R1 can generate several FEC packets to the second role R2, the third role R3 and the fourth role R4 to assist the second role R2 (P) in recovering the n-th packet and to assist the third role R3 in recovering the m-th packet, wherein the FEC packets are exemplified by the packets illustrated in FIG. 5. For example, the FEC packets include the result of the XOR operation of the n-th packet and the m-th packet.

Figure 6:
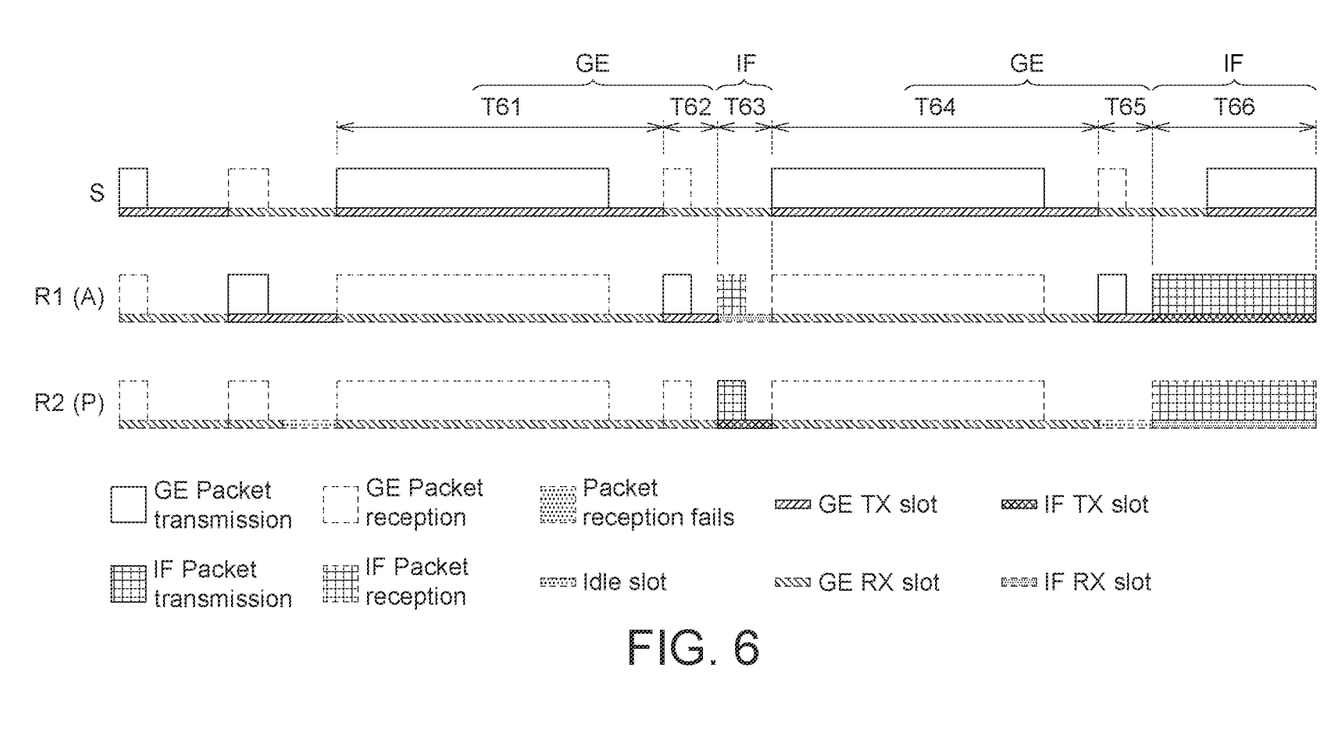
FIG. 6 is a timing diagram of reducing extra delay according to an embodiment of the present invention.

FIG. 6 is a timing diagram illustrating reduction of extra delay according to an embodiment of the present invention. As indicated in FIG. 6, when transmission traffic is relatively high or packets contain noises, the present embodiment can reduce extra delay. During a time period T61, the source device S transmits packets to the first role R1 and the second role R2. During a time period T62, the first role R1 transmits an acknowledge signal or a non-acknowledge signal to the source device S. In the present embodiment, after the first role R1 transmits the acknowledge signal or the non-acknowledge signal to the source device S, other roles (such as the second role R2, the third role R3 and the fourth R4) can send a partner request during an empty time slot (that is, the empty time slot where none of the first role R1 and the source device S transmits signals or packets) to trigger a re-transmission operation. During a time period T63, the second role R2 (P) sends a partner request (which is an IF packet) to the first role R1 during an empty time slot.

During a time period T64, (1) if the first role R1 transmits a non-acknowledge signal during the time period T62, then the source device S re-transmits packets; or (2) if the first role R1 transmits an acknowledge signal during the time period T62, then the source device S transmits new packets. During a time period T65, the first role R1 transmits the acknowledge signal or the non-acknowledge signal to the source device S.

During a time period T66, in response to the partner request received from the second role R2, the first role R1 re-transmits the packets to the second role R2. In other words, packet retransmission (which is responsive to the partner request) from the first role R1 to the second role R2 operates in IF.

Generally, providing an empty time slot is an initiation of performing packet retransmission. Once the empty time slot is provided, operation is switched from GE to IF. In the IF, packet retransmission is then performed.

In further detail, referring back to FIG. 4, during a time period immediately subsequent to time period T42, the source device S is in the GE TX slot (depicted in slash line), and however the source device S does not transmit any packets. Such time period is called the empty time slot. Since the empty time slot is provided, operation is switched to the IF. Packet retransmission is then performed during time periods T43, T44 and T45.

However, for a source device with heavy traffic or high noise, the source device continually transmits packets for a relatively long time. As such, the empty time slot cannot be provided during such transmission, and can be provided after such transmission is completed. As a result, extra delay is incurred.

In the present embodiment, with the partner request, an empty time slot is no longer required to proceed to IF. As a result, even if the source device S is with heavy traffic or high noise, no extra delay is incurred or extra delay is alleviated.

Figure 7:
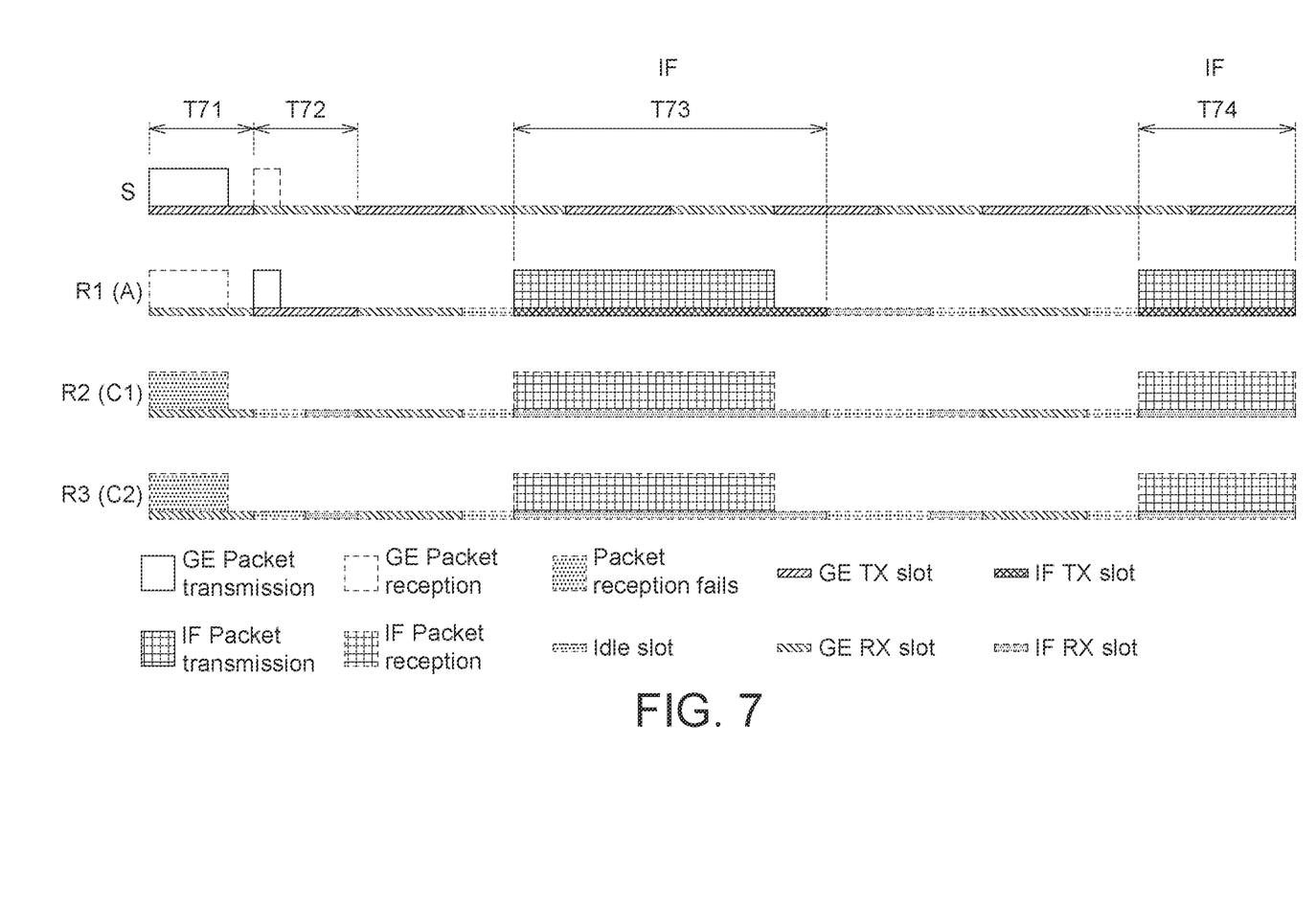
FIG. 7 is a schematic diagram of transmitting several redundant packets by an agent in an embodiment of the present invention.

FIG. 7 is a schematic diagram illustrating transmitting several redundant packets by the first role R1 in an embodiment of the present invention. In an embodiment of the present invention, the first role R1 can transmit several redundant packets (such as the FEC packets illustrated in FIG. 5) to the second role R2, the third role R3 and the fourth role R4, such that the second, third and fourth roles R2, R3 and R4 perform packet recovery according to the received redundant packets. During a time period T71, the source device S transmits packets, the first role R1 successfully receives the packets but the second role R2 (C1) and the third role R3 (C2) fail. During a time period T72, the first role R1 transmits an acknowledge signal or a non-acknowledge signal to the source device S. During time periods T73 and T74, the first role R1 proactively transmits the FEC packets to assist other roles (such as the second role R2 (C1) and the third role R3 (C2)) in recovering the packets which are not successfully received (for example, the packets transmitted by the source device S during the time period T71). That is, as indicated in FIG. 7, despite that the first role R1 does not recognize whether other role fails to receive the packets, the first role R1 proactively transmits the FEC packets to assist other roles in recovering the packets which are possibly lost.

Figure 8:
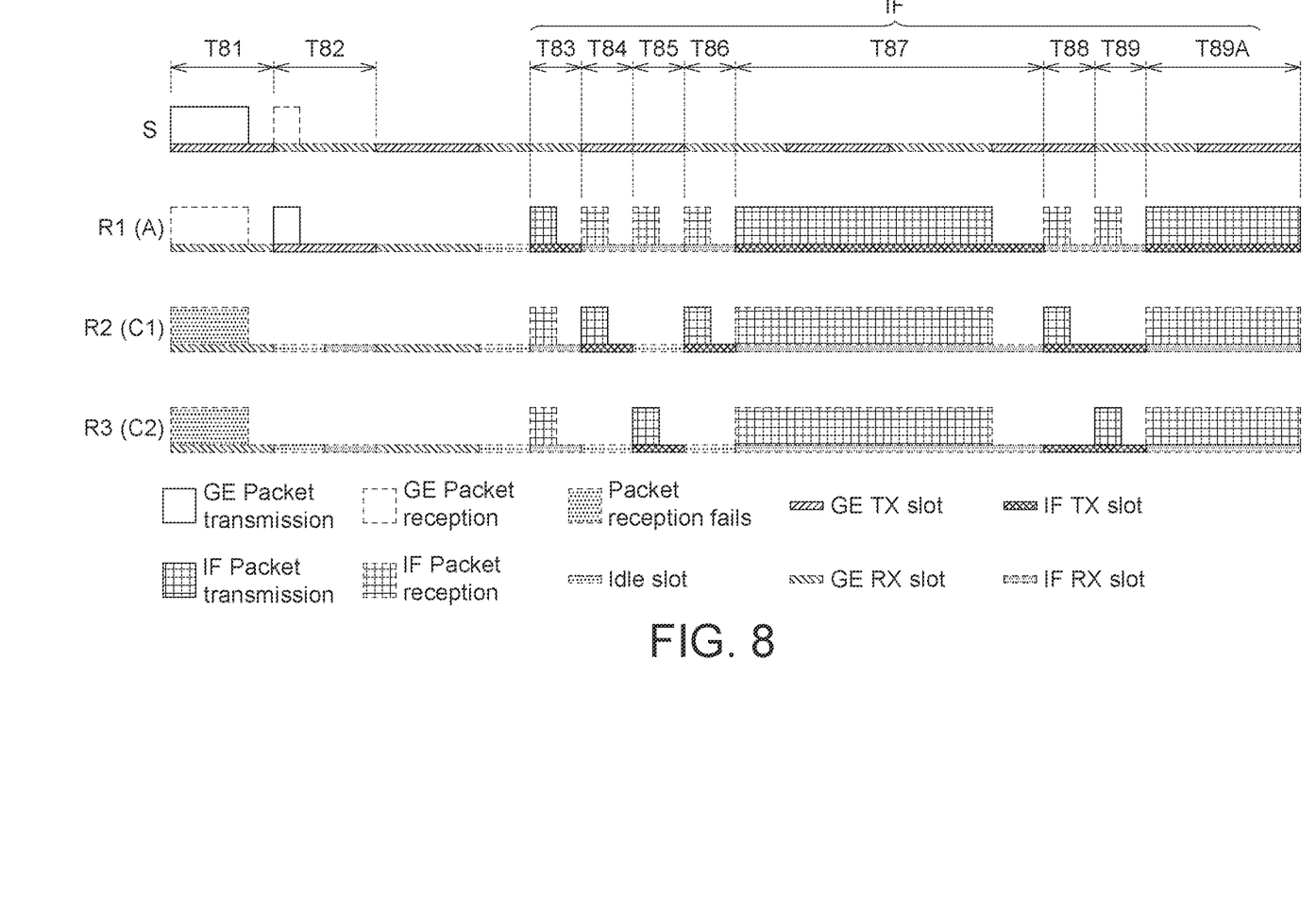
FIG. 8 is a schematic diagram of packet recovery in an embodiment of the present invention.

FIG. 8 is a schematic diagram illustrating packet recovery in an embodiment of the present invention. In an embodiment of the present invention, during a time period T81, the source device S transmits packets, the first role R1 (A) successfully receives the packets, but the second role R2 (C1) and the third role R3 (C2) fail. During a time period T82, the first role R1 (A) transmits an acknowledge signal or a non-acknowledge signal to the source device S. During a time period T83, the first role R1 (A) transmits extended packets (including a buffer state) to the second role R2 (C1) and the third role R3 (C2). During time periods T84 to T86, the second role R2 (C1) and the third role R3 (C2) transmit their own state reports to the first role R1 (A) (a quantity of lost extended packets can be indicated using different coding modes). For example, the second role R2 (C1) or the third role R3 (C2) can use instruction codes having different coding modes (such as AccessCode, HDR, Payload and CRC) to indicate the quantity of lost packets, such as 1, 2, 3 or 4. After the instruction codes are received, during a time period T87, the first role R1 (A) transmits the FEC packets to the second role R2 (C1) and the third role R3 (C2). During a time period T88, the second role R2 (C) transmits a "previous group response signal" to the first role R1 (A), wherein the "previous group response signal" indicates the packets that the second role R2 (C1) has lost in the previous group. For example, each group includes four packets from the source device S. Based on the "previous group response signal", the first role identifies that some roles have lost packets in a previous group. During a time period T89, the third role R3 (C2) transmits a "response signal" to the first role R1 (A), wherein the "response signal" indicates that the packets in the current group are re-transmitted. During a time period T89A, the first role R1 (A) transmits FEC packets to the second role R2 (C1) and the third role R3 (C2)

to assist the second role R2 (C1) and the third role R3 (C2) in recovering the packets in the previous group or the current group.

Under some circumstances, the first role R1 can perform a role handover procedure to hand over with other roles in a runtime state (for example, the first role R1 is not in the sleep mode).

Figure 9:
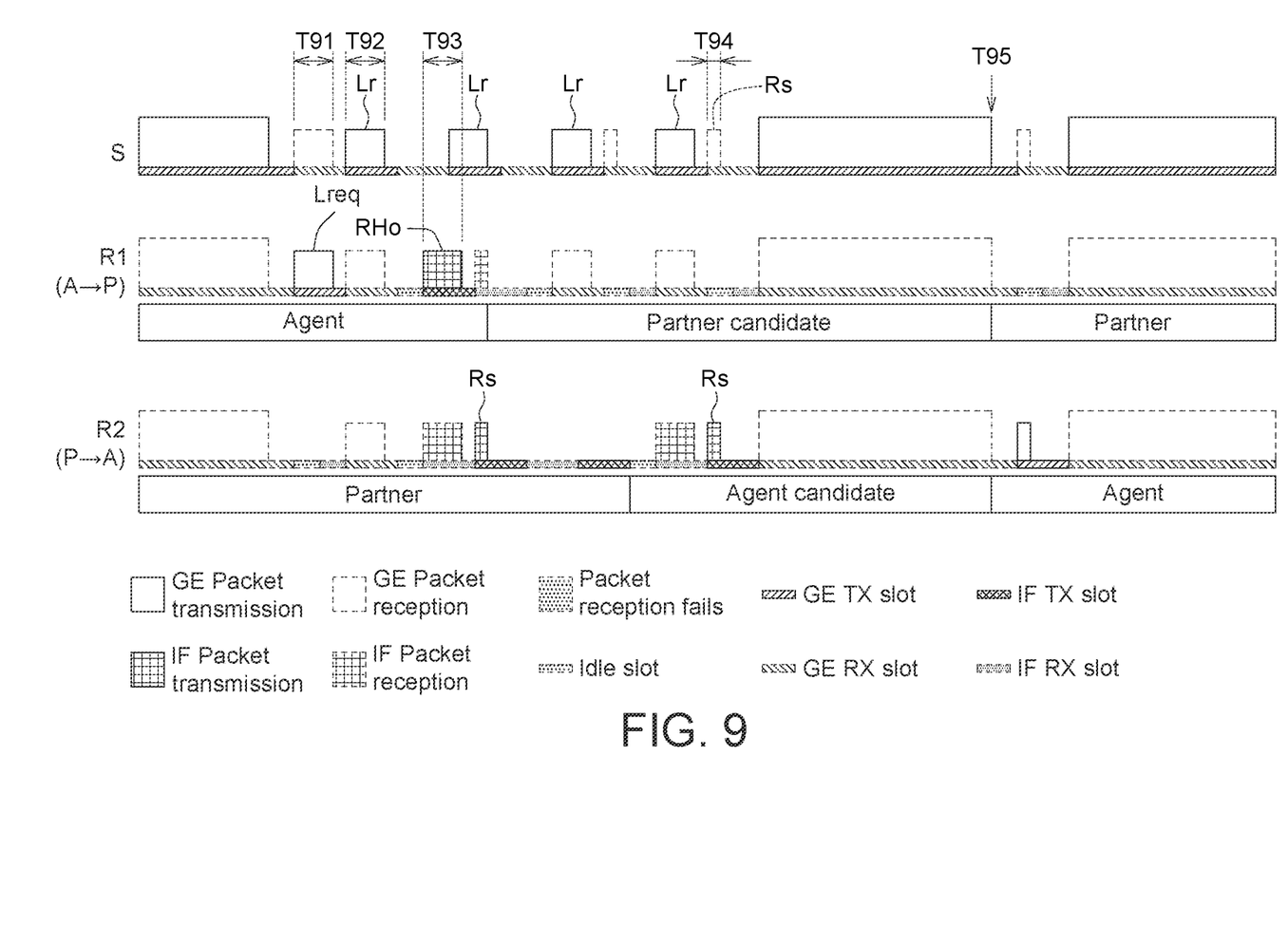
FIG. 9 is a schematic diagram of the role handover operation according to an embodiment of the present invention.

Referring to FIG. 9, a schematic diagram illustrating a role handover operation according to an embodiment of the present invention is shown. The role handover operation is performed when the first role R1 detects that the second role R2 is taken out of a reception module (such as a charging case) by a user but the first role R1 is not taken out of the reception module. That is, not the first role R1 but the second role R2 is taken out of the reception module. During a time period T91, the first role R1 sends a request Lreq to the source device S. After receiving the request Lreq, during a time period T92, the source device S sends a response Lr to the first role R1 and the second role R2 every period of time (a plurality of responses Lr are transmitted in total). In response to the response Lr, during a time period T93, the first role R1 transmits a role handover packet RHO to the second role R2. Next, the first role R1 is set as a second role candidate (for example, the partner candidate in FIG. 9), and the second role R2 is set as a first role candidate (for example, the agent candidate in FIG. 9). After receiving the role handover packet RHO, the first role candidate tries to transmit a response packet Rs which is responsive to the response Lr from the source device S. If the response packet Rs transmitted by the first role candidate is successfully received by the source device S (for example, during a time period T94), and if the packets from the source device S subsequently received by the first role candidate and the second role candidate are not the response Lr, then the first role R1 is set as a second role, the second role R2 is set as a first role (at a time point T95), and the role handover operation is completed. If the role handover operation fails, the first role R1 and the second role R2 maintain their current roles.

Additionally, the second role candidate does not need to respond to the response Lr.

In the above embodiment, when a role of a client appears, this indicates that a wireless audio output device is in a speaker mode; when role of a partner or a follower appears, this indicates that the wireless audio output device is in an earbud mode.

The wireless audio output device of embodiments of the present invention can support a source device which is implemented by a standard Bluetooth device. In other words, even without changing an original operation mode of the source device, the wireless audio output device of embodiments of the present invention is still compatible with the source device. Additionally, with a packet loss recovery function, a wireless audio output device of embodiments of the present invention can improve quality of audio output.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wireless audio output device, comprising:
a plurality of audio output units, a first audio output unit among the audio output units being set as a first role, and one of a plurality of second audio output units among the audio output units being set as a second role and another of the plurality of second audio output units being set as a third role, wherein:
the first role is configured to establish a multicast link with a source device, to receive one or more media packets from the source device on the multicast link, and to perform bidirectional communication with the source device; and
the second role and the third role are configured to join the multicast link, to receive the one or more media packets from the source device on the multicast link, to perform unidirectional communication with the source device, and to perform unidirectional and/or bidirectional communication with the first role,
wherein an extended packet time slot is divided, the first role transmits a first extended packet to the second role and the third role during the extended packet time slot, the second role and the third role transmit a second extended packet and a third extended packet to the first role respectively in different timing of the extended packet time slot.

2. The wireless audio output device according to claim 1, wherein each of the second role and the third role comprises a client, a partner and a follower, wherein the client serves as a reception node in the multicast link, the partner serves as a role which exchanges data with the first role, and the follower serves as a role which supports media data recovery with the first role.

3. The wireless audio output device according to claim 1, wherein when the first role transmits the first extended packet to the second role and the third role, a start time for transmitting the first extended packet is not aligned with a start time of a receiving slot of the source device,
wherein the first extended packet indicating a buffer report of the first role,
wherein in response to the first extended packet, the second role transmits the second extended packet to the first role, the second extended packet indicating a packet loss state of the second role, and
wherein in response to the second extended packet, the first role transmits a first error correction packet for the second role to perform packet recovery.

4. The wireless audio output device according to claim 1, wherein after the first role transmits an acknowledge signal or a non-acknowledge signal to the source device, the second role transmits a partner request to the first role during an empty time slot to request the first role to re-transmit packets to the second role.

5. The wireless audio output device according to claim 1, wherein the first role proactively transmits at least one redundant packet for the second role to perform packet recovery according to the received at least one redundant packet.

6. The wireless audio output device according to claim 3, wherein,
when the second role fails to receive packets, the second role indicates a quantity of lost packets to the first role using a plurality of instruction codes having different coding modes; and
after receiving the instruction codes, the first role transmits a second error correction packet to the second role for the second role to perform packet recovery.

7. The wireless audio output device according to claim 3, wherein,
the second role transmits a previous group response signal to the first role, the previous group response signal indicating a packet that the second role lost in a previous group; and
the first role transmits a third error correction packet to the second role for the second role to recover lost packets in the previous group.

8. The wireless audio output device according to claim 1, wherein the first role performs a role handover procedure to hand over with the second role.

9. An operation method for a wireless audio output device, the wireless audio output device comprising a plurality of audio output units, a first audio output unit among the audio output units being set as a first role and one of a plurality of second audio output units among the audio output units being set as a second role and another of the plurality of second audio output units being set as a third role, and the operation method comprising:
establishing a multicast link with a source device by the first role to receive one or more media packets from the source device on the multicast link, and to perform bidirectional communication with the source device;
joining the multicast link by the second role and the third role to receive the one or more media packets from the source device on the multicast link, to perform unidirectional communication with the source device, and to perform unidirectional and/or bidirectional communication with the first role,
wherein an extended packet time slot is divided, the first role transmits a first extended packet to the second role and the third role during the extended packet time slot, the second role and the third role transmit a second extended packet and a third extended packet to the first role respectively in different timing of the extended packet time slot.

10. The operation method of the wireless audio output device according to claim 9, wherein each of the second role and the third role comprises a client, a partner and a follower, wherein the client serves as a reception node in the multicast link, the partner serves as a role which exchanges data with the first role, and the follower serves as a role which supports media data recovery with the first role.

11. The operation method of the wireless audio output device according to claim 9, wherein
when the first role transmits the first extended packet to the second role and the third role, a start time for transmitting the first extended packets is not aligned with a start time of a receiving slot of the source device,
wherein the first extended packet indicating a buffer report of the first role,
wherein in response to the first extended packet, the second role transmits the second extended packet to the first role, the second extended packet indicating a packet loss state of the second role, and
wherein in response to the second extended packet, the first role transmits a first error correction packet for the second role to perform packet recovery.

12. The operation method of the wireless audio output device according to claim 9, wherein after the first role transmits an acknowledge signal or a non-acknowledge signal to the source device, the second role sends a partner request to the first role during an empty time slot to request the first role to re-transmit packets to the second role.

13. The operation method of the wireless audio output device according to claim 9, wherein the first role proactively transmits at least one redundant packet for the second role to perform packet recovery according to the received at least one redundant packet.

14. The operation method of the wireless audio output device according to claim 11, wherein
when the second role fails to receive packets, the second role indicates a quantity of lost packets to the first role using a plurality of instruction codes having different coding modes; and
after receiving the instruction codes, the first role transmits a second error correction packet to the second role for the second role to perform packet recovery.

15. The operation method of the wireless audio output device according to claim 11, wherein
the second role transmits a previous group response signal to the first role, the previous group response signal indicating a packet that the second role lost in a previous group; and
the first role transmits a third error correction packet to the second role for the second role to recover lost packets in the previous group.

16. The operation method of the wireless audio output device according to claim 9, wherein the first role performs a role handover procedure to hand over with the second role.

* * * * *